United States Patent
Philbrick

(10) Patent No.: US 12,242,580 B1
(45) Date of Patent: Mar. 4, 2025

(54) GAZE DETECTION AND APPLICATION

(71) Applicant: UIPCO, LLC, San Antonio, TX (US)

(72) Inventor: Ashley Raine Philbrick, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 327 days.

(21) Appl. No.: 17/871,932

(22) Filed: Jul. 23, 2022

Related U.S. Application Data

(60) Provisional application No. 63/225,367, filed on Jul. 23, 2021.

(51) Int. Cl.
  *G06F 21/00* (2013.01)
  *G06F 3/01* (2006.01)
  *G06F 21/32* (2013.01)
  *G06F 21/62* (2013.01)

(52) U.S. Cl.
  CPC .............. *G06F 21/32* (2013.01); *G06F 3/013* (2013.01); *G06F 21/6245* (2013.01)

(58) Field of Classification Search
  CPC ....... G06F 21/32; G06F 3/013; G06F 21/6245
  See application file for complete search history.

(56) References Cited

U.S. PATENT DOCUMENTS

| | | | | |
|---|---|---|---|---|
| 8,922,480 B1 * | 12/2014 | Freed | .................... | G06F 3/0304 |
| | | | | 382/103 |
| 9,100,540 B1 * | 8/2015 | Gates | ..................... | H04N 7/15 |
| 9,202,443 B2 * | 12/2015 | Perez | ................. | G02B 27/0172 |
| 9,740,282 B1 * | 8/2017 | McInerny | ............ | G02B 27/017 |
| 10,872,203 B2 * | 12/2020 | Orr | ....................... | G06F 3/0237 |
| 11,150,860 B1 * | 10/2021 | Bull | ........................ | G06F 3/1454 |
| 11,321,865 B1 * | 5/2022 | Kim | ......................... | G06F 7/57 |
| 11,416,074 B1 * | 8/2022 | Trincia | ................... | G02B 1/045 |
| 11,475,610 B1 * | 10/2022 | Etwaru | ................... | G06F 9/451 |
| 11,520,152 B1 * | 12/2022 | Lau | ................... | G02B 27/0172 |
| 11,562,153 B1 * | 1/2023 | Etwaru | ................... | G06F 40/58 |
| 11,615,430 B1 * | 3/2023 | Sharma | ............. | G06Q 30/0201 |
| | | | | 705/7.29 |
| 11,762,454 B2 * | 9/2023 | Park | ....................... | G06F 3/013 |
| | | | | 345/633 |

(Continued)

FOREIGN PATENT DOCUMENTS

| | | | | | |
|---|---|---|---|---|---|
| KR | 20200079170 A | * | 7/2020 | ............. | G06F 18/24 |

*Primary Examiner* — Don G Zhao
(74) *Attorney, Agent, or Firm* — Perkins Coie LLP

(57) ABSTRACT

A gaze detection and application system can determine gaze points for user gazes, determine the contexts of gaze points, and customize contents on display devices, such as by making them visible. The gaze detection and application system can use camera devices to determine a display point (the "gaze point") corresponding to where a user is currently gazing at in real-time on a display device. In some implementations, the gaze detection and application system can determine whether the gaze point is in proximity to sensitive contents hidden on the display device. The gaze detection and application system can identify subjects within a camera frame and can determine whether the identified subjects are permitted to access the sensitive contents. If the subjects are permitted, then the gaze detection and application system can make the sensitive contents visible on the display device.

20 Claims, 9 Drawing Sheets

(56) References Cited

U.S. PATENT DOCUMENTS

| | | | |
|---|---|---|---|
| 11,769,159 B2* | 9/2023 | Chaudhuri | G06V 10/811 705/7.29 |
| 11,829,497 B2* | 11/2023 | Taylor | G06F 3/147 |
| 2009/0141895 A1* | 6/2009 | Anderson | G06F 21/84 380/252 |
| 2013/0050070 A1* | 2/2013 | Lewis | G06F 3/013 351/210 |
| 2013/0114043 A1* | 5/2013 | Balan | H04N 13/344 351/210 |
| 2014/0067368 A1* | 3/2014 | Yih | G06F 16/3338 704/9 |
| 2014/0201844 A1* | 7/2014 | Buck | G06F 21/554 726/26 |
| 2014/0222724 A1* | 8/2014 | Gao | G06N 20/00 706/12 |
| 2014/0354539 A1* | 12/2014 | Skogo | G06F 3/013 345/156 |
| 2016/0040996 A1* | 2/2016 | Skillman | G01C 21/3664 701/533 |
| 2016/0077734 A1* | 3/2016 | Buxton | G06F 3/04886 715/773 |
| 2016/0232399 A1* | 8/2016 | Kempinski | G06V 40/193 |
| 2017/0115742 A1* | 4/2017 | Xing | G06F 3/0485 |
| 2017/0236304 A1* | 8/2017 | Kempinski | G06F 3/013 382/117 |
| 2017/0255786 A1* | 9/2017 | Krishnamurthi | G06F 21/32 |
| 2017/0308162 A1* | 10/2017 | Xu | G06F 16/436 |
| 2018/0136486 A1* | 5/2018 | Macnamara | G06F 1/14 |
| 2018/0211112 A1* | 7/2018 | Asbun | G02B 27/017 |
| 2018/0300510 A1* | 10/2018 | Lam | G06F 21/6245 |
| 2019/0147288 A1* | 5/2019 | Gupta | G06F 3/013 715/253 |
| 2019/0188895 A1* | 6/2019 | Miller, IV | G06F 3/017 |
| 2019/0251707 A1* | 8/2019 | Gupta | G06T 9/002 |
| 2020/0050265 A1* | 2/2020 | Krishnakumar | G06F 3/013 |
| 2020/0073143 A1* | 3/2020 | Macnamara | G02C 7/027 |
| 2020/0240788 A1* | 7/2020 | Iyer | G06F 3/011 |
| 2020/0241632 A1* | 7/2020 | Iyer | G06F 3/017 |
| 2020/0244996 A1* | 7/2020 | Iyer | H04N 19/513 |
| 2020/0368616 A1* | 11/2020 | Delamont | H04N 13/239 |
| 2020/0401219 A1* | 12/2020 | Freiin von Kapri | A61B 34/25 |
| 2021/0004589 A1* | 1/2021 | Turkelson | G06V 30/19173 |
| 2021/0294926 A1* | 9/2021 | Duffy | G06F 21/84 |
| 2022/0188456 A1* | 6/2022 | Vaughan | G06F 21/6254 |
| 2022/0253149 A1* | 8/2022 | Berliner | G06F 3/012 |
| 2022/0254120 A1* | 8/2022 | Berliner | G06F 1/163 |
| 2023/0045610 A1* | 2/2023 | Iyer | H04L 65/1083 |
| 2023/0094048 A1* | 3/2023 | Neves Creto | G08B 5/22 345/156 |
| 2023/0314808 A1* | 10/2023 | Olson | G02B 27/0172 359/630 |
| 2023/0325059 A1* | 10/2023 | Le | G06F 3/013 345/156 |
| 2023/0403432 A1* | 12/2023 | Sethuraman | H04N 21/4542 |
| 2024/0094819 A1* | 3/2024 | Nie | G06F 3/016 |
| 2024/0103614 A1* | 3/2024 | Dryer | G06F 3/013 |
| 2024/0104849 A1* | 3/2024 | Nie | G06F 3/013 |
| 2024/0105079 A1* | 3/2024 | Theobald | G09B 19/00 |
| 2024/0126365 A1* | 4/2024 | Lagun | G06T 11/60 |

* cited by examiner

GAZE DETECTION AND APPLICATION

CROSS-REFERENCE TO RELATED APPLICATION

This application is a non-provisional of and claims priority to U.S. Provisional Application No. 63/225,367 filed on Jul. 23, 2021, entitled "GAZE DETECTION AND APPLICATION," which is hereby incorporated by reference in its entirety for all purposes.

TECHNICAL FIELD

The present disclosure is directed to gaze detection with security functionality.

BACKGROUND

Gaze tracking has become increasingly more important in human computer interaction and computer graphics. The gaze of a user can be defined as the user's present line of sight and point of fixation. By determining the user's gaze, systems can gather valuable data related to the gaze and interpret possible user requests. For example, a system may determine that a user's gaze is fixated on a point in space and determine what object of interest the point pertains to. The system can gather data related to the gaze (e.g., information regarding the area the object being gazed at occupies, data collected from the user's body language), and in response carry out further actions. In some systems, specialized equipment that is typically operated at a facility is required for gathering such data and requests, foreclosing the use of gaze information in daily user activities.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
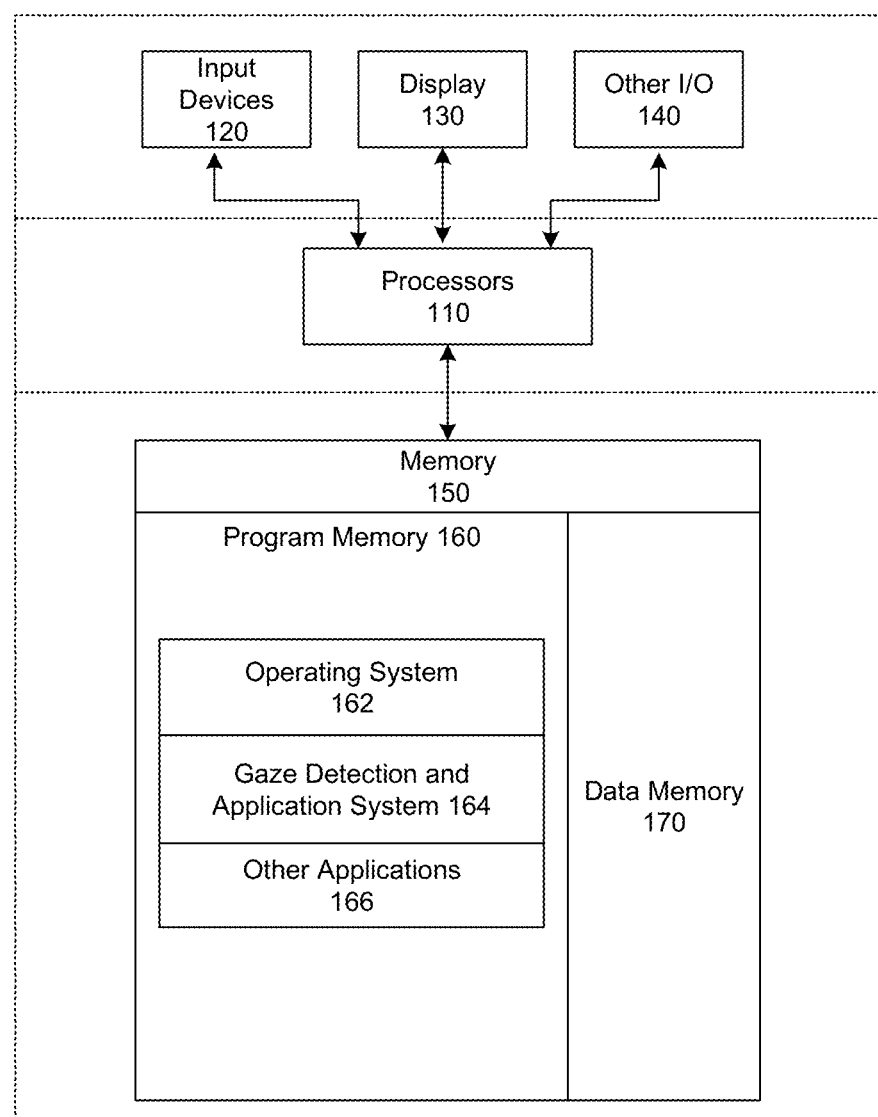
FIG. 1 is a block diagram illustrating an overview of devices on which some implementations can operate.

Aspects of the present disclosure are directed to a gaze detection and application system. When users of computing devices are gazing at items displayed on their displays screen, it can be difficult to capture non-verbal feedback such as where on the display the user is gazing at, the user's body language, and their facial expressions. While some technical systems can gather gaze data, these existing systems often require complex equipment that are typically operated at a specialized facility. This can require the expense of operating the facility and becomes a hassle for users to go to them. Furthermore, the user's gaze, body language, and facial identity can often be rich in data and informative as to their reaction to certain types of items presented on the display.

Feedback on the user's gaze can also be informative for security applications that can utilize information regarding which point on a display a user is currently the user's focus, coupled with their identity and/or body language to determine whether to present sensitive contents to the user. For example, if there are users that are not permitted to gaze at certain sensitive content items, it can be crucial to extract and evaluate data related to the user's gaze, body language, and facial identity. Existing complex systems lack the integration and availability to achieve such features in end-user systems.

The gaze detection and application system can determine gaze points for user gazes, determine the contexts of gaze points, and securely make contents on display devices visible. As used herein, a "gaze point" is a point (e.g., display pixel(s)) on a display device corresponding to where a user is currently looking. The gaze point can move depending on where the user is looking during various times. The gaze detection and application system can be configured and determine gaze points with publicly available technologies (e.g., computer display monitor, webcams, smartphone/tablet cameras, digital cameras). By deploying a simple calibration process, the gaze detection and application system can easily collect large amounts of rich contextual data regarding a user's gaze (e.g., the user's identity, body language, emotional state, focus length and location). The gaze detection and application system can then carry out further useful applications, such as determining when to securely display sensitive contents to users or provide the contextual data to moderators for further response.

In some implementations, the gaze detection and application system comprises a display device and two camera devices located in separate places near the display device. For example, one of the camera devices can be placed at the top left of the display device and another camera device placed at the bottom right of the display device. To setup for gaze detection, the gaze detection and application system can first receive metadata from the display and cameras. The display device's metadata can include, but is not limited to, the display size, the display resolution, and the position of the display device relative to the camera devices. The camera devices' metadata can include, but is not limited to, the positions of the one or more camera devices relative to the display device, intrinsic camera parameters, and extrinsic camera parameters.

The gaze detection and application system can then begin a calibration process by displaying a sequence of calibration points on the display one at a time to the user for feedback. The calibration points can be randomly dispersed in locations on the screen or can be located at predefined locations (e.g., left, right, top, bottom of display screen). For each calibration point displayed, the gaze detection and application system can request the user to look at the calibration point. The gaze detection and application system can then receive an indication from the user (e.g., a mouse click of a button on the display device, pressing a keyboard key, saying a word, etc.) that they are currently gazing at the calibration point. In response to the indication, the gaze detection and application system can determine a gaze vector associated with the calibration point based on the display metadata, camera metadata, and images/videos from the camera devices that track the user's eyes and/or head. The gaze vector is a line that extends at a measured angle from the user's eyes and/or head and intersects with the display device at a corresponding point (e.g., the corresponding calibration point). More details on gaze vectors are described below in relation to FIG. 4. The number of calibration points and corresponding gaze vectors needed for setup can depend on the mapping function used (e.g., second order polynomial, linear order polynomial n-order polynomial, an analytical function) to uniquely map any vector to any point on the display device. Once enough calibration points are collected, the gaze detection and application system can create a mapping of any gaze vector to any point on the display device by fitting the calibration points and corresponding gaze vectors to the mapping function.

After setup, the gaze detection and application system can identify gaze points for the user gazing at the display device. The gaze detection and application system can receive real-time images/videos of the user looking at the display and determine a gaze vector corresponding to the user's gaze. Using the previously setup mapping, the gaze detection and application system can identify a gaze point on the display device corresponding to the gaze vector. In other words, the gaze detection and application system can determine where on the display device the user is looking, in real-time. In some implementations, the gaze detection and application system can display the identified gaze point on the display device as a visual element (e.g., a dot, cursor, asterisk, etc.) For example, the gaze detection and application system can determine that a user is currently gazing at one or more pixels (the gaze point) on the bottom right of the display screen and, in response to a user command, move the cursor on the screen to where those pixels are located. In some implementations, gaze detection and application system can identify gaze points for multiple users within the frame of the camera devices. The gaze detection and application system can determine a gaze vector for each user and identify the corresponding gaze point on the display for each gaze vector in parallel or sequentially.

In some implementations, the gaze detection and application system can use the identified gaze point to determine whether to make sensitive contents on the display device visible. The gaze detection and application system can determine whether the gaze point is in proximity to sensitive contents that are currently blurred or darkened on the display device. For example, the sensitive contents can be a webpage for accessing a user's email inbox that is currently blurred or darkened in the center of the display device. In response to determining that gaze point is in proximity to the sensitive contents, the gaze detection and application system can identify one or more subjects within the frame of the camera devices. For example, the subjects can be a husband (the user) and a wife (person in the background) currently within the frame of the camera device and identified using a face detection model. Based on the identities of the subjects within the frame, the gaze detection and application system can determine whether the identified subjects are permitted to access the sensitive contents currently blurred or darkened on the display device. In response to determining that the identified subjects are permitted to access the sensitive contents, the gaze detection and application system can make the sensitive content visible to the user on the display device. Continuing with the previous example, the gaze detection and application system can determine that the husband and the wife are both permitted to access the email account (e.g., shared couple account) and in response unblur or display the email inbox to the user (the husband).

In some implementations, the gaze detection and application system can also determine a gaze context (e.g., the user's identity, body language, emotional state, focus length) in relation to an element displayed on the display device (e.g., advertisement, notification, pop-up, email or message alert). The gaze detection and application system can receive an indication of a display element being displayed on the display device. For example, the gaze detection and application system can receive indication that an advertisement pop-up is being displayed on the lower left of the display screen. The gaze detection and application system can then determine the gaze point for where the user is currently looking at on the display device. To check whether the user is looking at the display element, the gaze detection and application system can determine whether the location of the gaze point is within a predefined threshold distance of the display element. In response to determining that the gaze point is within threshold distance, the gaze detection and application system can determine the gaze context of the user's gaze based on analysis of images/videos from the camera device and contextual data regarding the gaze point. Types of analysis performed can include, but is not limited to, determining the user's body language or emotional state when reacting to the display element, or how long the gaze point stayed on the display element. For example, the gaze detection and application system can determine that the user appeared happy to see an advertisement for shoe sale displayed on the lower left where they are gazing at. After determining the gaze context, the gaze detection and application system can provide the gaze context and corresponding display element to a third-party interested in performing further analysis of the context in relation to the display element. For example, a security agency can be interested in user's reactions to possible online scamming pop-ups.

Various gaze tracking systems can detect a user's gaze. These systems are often complex, requiring technical equipment and specialized devices, making gaze tracking inaccessible. Smart glasses, complex camera setups, and eye tracking devices have been developed to carry out gaze tracking but are not always accessible to users. The complications become even more pronounced when such gaze tracking systems require the operation of a specific facility and can become a hassle for users to have to be present in those facilities for gaze tracking to be performed. Existing technologies also fall short of collecting user gaze data and using it to get feedback on how the user is reacting to their surroundings. A user's gaze and the context of the gaze can often be rich in information and provide insight into their cognitive state. Security systems have been developed to verify user identities, but often fall short of harnessing the user's gaze as a gateway for secure verification.

The gaze detection and application system and processes described herein are expected to overcome these problems associated with conventional gaze tracking systems and security applications. By enabling users to use commercially available camera devices and display devices in any physical environment (e.g., home, office, store, lab), the gaze detection and application system and processes can setup its components for gaze detection quickly, effortlessly, and accessibly. The gaze detection and application system and processes can transform a user's gaze (an analog signal or property) to a respective point on a display device (a digital element), which is a meaningful reduction of a subjective visual state to an objective virtual element. A user can shift where he/she is looking on a display screen, and the gaze detection and application system can perform time-mappings of the user's gaze to different points on the display. By using just simple devices, the gaze detection and application system and processes can reduce the computing resources needed to perform accurate gaze tracking.

Furthermore, the gaze detection and application system and processes can increase security by utilizing a user's gaze to determine whether to present sensitive or classified contents to the user. By tracking where a user is gazing at on a display device, the gaze detection and application system and processes can perform identity verification, suspicious activity tracking, and/or lie-detection to make decisions regarding whether to give the user access to sensitive contents. The result is safer, more secure, and more reliable computing and networking systems. The gaze detection and application system and processes can also collect rich contextual data associated with the user to obtain feedback on how the user has reacted to content items displayed to the user. Collecting such contextual data can allow entities associated with the content items to provide better content items geared towards the user's preferences and filter out those content items with negative feedback from the user. This can reduce the traffic and bandwidth over existing communication systems, since unnecessary content data can be removed. Such contextual data can also inform third-parties whether to act or perform security mitigation in response to, e.g., the user fearing their computing device has been compromised by a virus or the user is being tricked by phishing. These applications of the gaze detection and application system and processes provide further increases in security, safety, and reliability of computing and networking systems.

Several implementations are discussed below in more detail in reference to the figures. FIG. 1 is a block diagram illustrating an overview of devices on which some implementations of the disclosed technology can operate. The devices can comprise hardware components of a device 100 that can determine gaze points for user gazes, determine the contexts of gaze points, and securely make contents on display devices visible. Device 100 can include one or more input devices 120 that provide input to the Processor(s) 110 (e.g., CPU(s), GPU(s), HPU(s), etc.), notifying it of actions. The actions can be mediated by a hardware controller that interprets the signals received from the input device and communicates the information to the processors 110 using a communication protocol. Input devices 120 include, for example, a mouse, a keyboard, a touchscreen, an infrared sensor, a touchpad, a wearable input device, a camera- or image-based input device, a microphone, or other user input devices.

Processors 110 can be a single processing unit or multiple processing units in a device or distributed across multiple devices. Processors 110 can be coupled to other hardware devices, for example, with the use of a bus, such as a PCI bus or SCSI bus. The processors 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The processors 110 can have access to a memory 150 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, gaze detection and application system 164, and other application programs 166. Memory 150 can also include data memory 170, e.g., camera device metadata, display device metadata, calibration points, gaze vectors used for calibration, eye vectors, eye orientations and angles, head orientations and angles, 3D models of user heads and eyes, mapping functions, gaze calibration vectors, camera images and videos, display elements, visual indicators, gaze points, gaze vectors, gaze contextual data, subject data, identity detection, body language data, emotional state data, trained machine learning models, third-party contact information, configuration data, settings, user options or preferences, etc., which can be provided to the program memory 160 or any element of the device 100.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
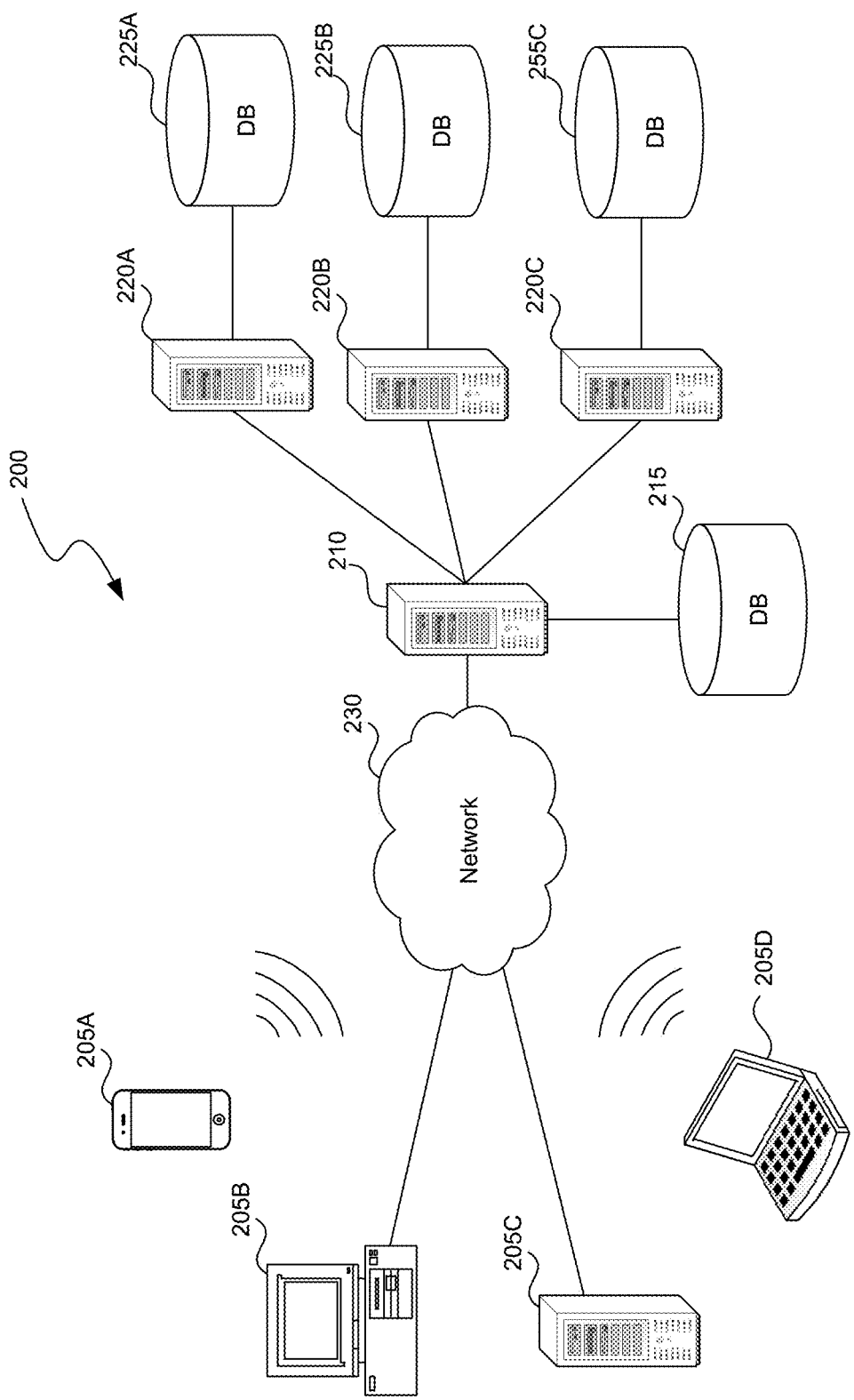
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g., store) information such as camera device metadata, display device metadata, calibration points, gaze vectors used for calibration, eye vectors, eye orientations and angles, head orientations and angles, 3D models of user heads and eyes, mapping functions, gaze calibration vectors, camera images and videos, display elements, visual indicators, gaze points, gaze vectors, gaze contextual data, subject data, identity detection, body language data, emotional state data, trained machine learning models, third-party contact information. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
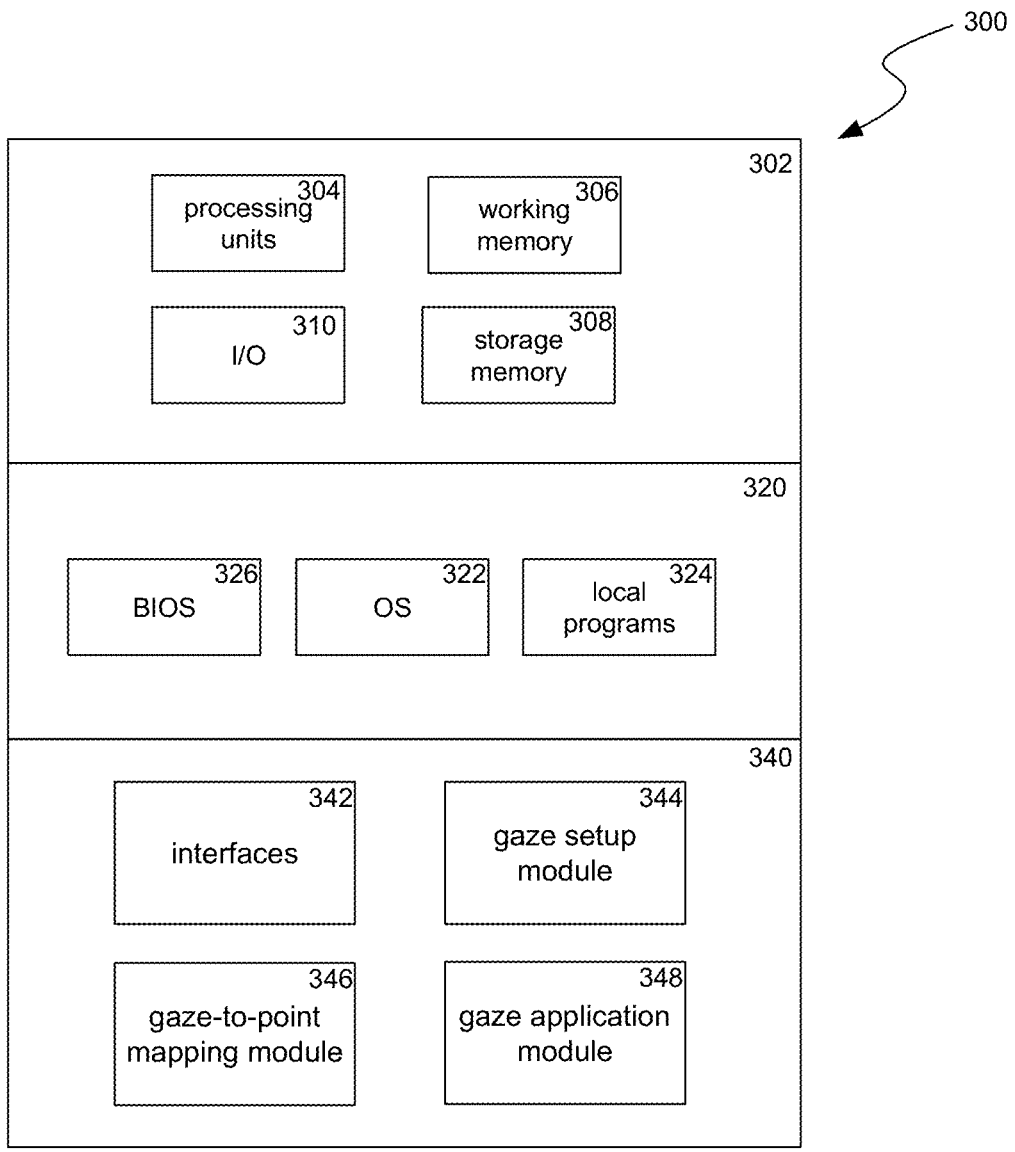
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g., CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g., a redundant array of independent disks (RAID)) accessible through a system bus or can be a cloud storage provider or other network storage accessible via one or more communications networks (e.g., a network accessible storage (NAS) device, such as storage 215 or storage provided through another server 220). Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include, for example, gaze setup module 344, gaze-to-point mapping module 346, gaze application module 348, and components which can be used for providing user interfaces, transferring data, and controlling the specialized components, such as interfaces 342. In some implementations, components 300 can be in a computing system that is distributed across multiple computing devices or can be an interface to a server-based application executing one or more of specialized components 340. Although depicted as separate components, specialized components 340 may be logical or other nonphysical differentiations of functions and/or may be submodules or code-blocks of one or more applications.

Gaze setup module 344 can create a mapping of user gaze vectors to gaze points on a display device to be used by gaze-to-point mapping module 346. In some implementations, gaze setup module can receive, via interfaces 342, camera metadata from camera devices of I/O 310 and display metadata from display device(s) of I/O 310. Gaze setup module 344 can cause, via interfaces 342, display of a calibration point on display device(s) of I/O 310. Gaze setup module 344 can then receive indication from a mouse device of I/O 310 that the user is looking at the calibration point. When the indication is received, gaze setup module 344 can immediately cause the camera devices of I/O 310 to capture an image/video of the user and their gaze at the moment. Based on the captured image/video and the metadata from the cameras and display, gaze setup module 344 can determine a gaze vector corresponding to the calibration point. Gaze setup module 344 continues to display new calibration points and determine corresponding gaze vectors until enough are collected to create a unique mapping of gaze vectors to gaze points on the display device(s) of I/O 310. Once enough calibration points are used, gaze setup module 344 can create a mapping of any gaze vector to any gaze point based on the calibration points and corresponding gaze vectors. Gaze setup module 344 can then provide, via interfaces 342, the gaze-to-point mapping to gaze-to-point mapping module 346 for further usage. Additional details on setting up gaze detection are provided below in relation to FIG. 4.

Gaze-to-point mapping module 346 can determine gaze points for user gazes using the mapping provided by gaze setup module 344. In some implementations, gaze-to-point mapping module 346 can first determine a gaze vector corresponding to a user's gaze based on images/videos, from camera devices of I/O 310, that can be stored in working memory 306 and/or storage memory 308. Gaze-to-point mapping module can track the eyes and/or head of the user in the images/videos to determine the gaze vector. For example, the gaze-to-point mapping module 346 can determine a position of a user's cornea based on a pattern of reflected light off the user's eye-such as by identifying a ring of lights that indicate reflections around the raised part of the eye that makes up the cornea. The gaze-to-point mapping module 346 can determine the gaze vector as coming from the center of the identified cornea and being perpendicular to a plan formed by the pattern of reflected lights. In some implementations, gaze-to-point mapping module can use 3D models of the user's head/face stored in working memory 306 and/or storage memory 308 to further determine the gaze vector (e.g., mapping identified features such as the nose, eyes, and ears onto a model of the user's head to get a head position and mapping the identified cornea positions onto models of the user's eyes to get eye positions). After determining the gaze vector, gaze-to-point mapping module 346 can identify a gaze point on the display device(s) of I/O 310 corresponding to the gaze vector by mapping the gaze vector to the gaze point using the gaze-to-point mapping provided, via interfaces 342, by gaze setup module 344. In some implementations, gaze-to-point mapping module can cause, via interfaces 342, display of the gaze point on the display device(s) of I/O 310. Additional details on determining mappings of gazes to points on a display are provided below in relation to FIG. 5.

Gaze application module 348 can use gaze points to determine gaze contexts or to make sensitive contents visible in a secure way. In some implementations, gaze application module 348 can first receive indication, via interfaces 342, that a display element is displayed on the display device(s) of I/O 310. When the indication is received, gaze application module 348 can identify the location or pixel coordinates of the current gaze point determined by gaze-to-point mapping module. Gaze application module 348 can then determine whether the display coordinates of the gaze point are near the display coordinates of the display element. If the points are near one another, gaze application module 348 can determine a gaze context associated with the gaze point. For example, gaze application module 348 can obtain, from working memory 306 and/or storage memory 308, a machine learning model trained to predict contexts such as user identity, facial expressions, body language, and/or emotional state. Gaze application module 348 can use such models to determine the gaze context in reaction to the display element. After determining the gaze context, gaze application module 348 can provide, via interfaces 342, the gaze context to other entities (e.g., moderators, advertising companies, security agencies) for further processing and/or to modify one or more displayed elements. For example, depending on the identified identity of the user, the contents can be customized for that user. As a more specific example, if two people are viewing a display device showing banking information, each person can be looking at a different portion of the display (as identified by the gaze-to-point mapping module 346 for each person), and the gaze application module 348 can show the banking information, in the area of each user's gaze, for their individual accounts.

In various implementations, gaze application module 348 can first determine a gaze point by causing, via interfaces 342, gaze-to-point mapping module 346 to determine and provide the gaze point to gaze application module 348. Gaze application module 348 can determine whether the gaze point is near sensitive contents currently blurred, blackened, or not displayed on the display devices(s) of I/O 310. If the gaze point is near sensitive contents, gaze application module 348 can identify the subjects that are currently within the frame of the camera devices of I/O 310. For example, gaze application module 348 can obtain images/videos of the user's face stored in working memory 306 and/or storage memory 308 and apply the images/videos to a face detection model for identifying the subject. After determining the identities of the subjects, gaze application module 348 can determine whether the subjects are permitted to access the sensitive contents. Only identities determined to have privileges to access the sensitive contents can be permitted to see the sensitive contents. If the subjects are permitted to see the sensitive contents, then gaze application module 348 can cause, via interfaces 342, display of the sensitive contents on the display device(s) of I/O 310. Additional details on applications using gaze point determinations are provided below in relation to FIGS. 6A and 6B.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
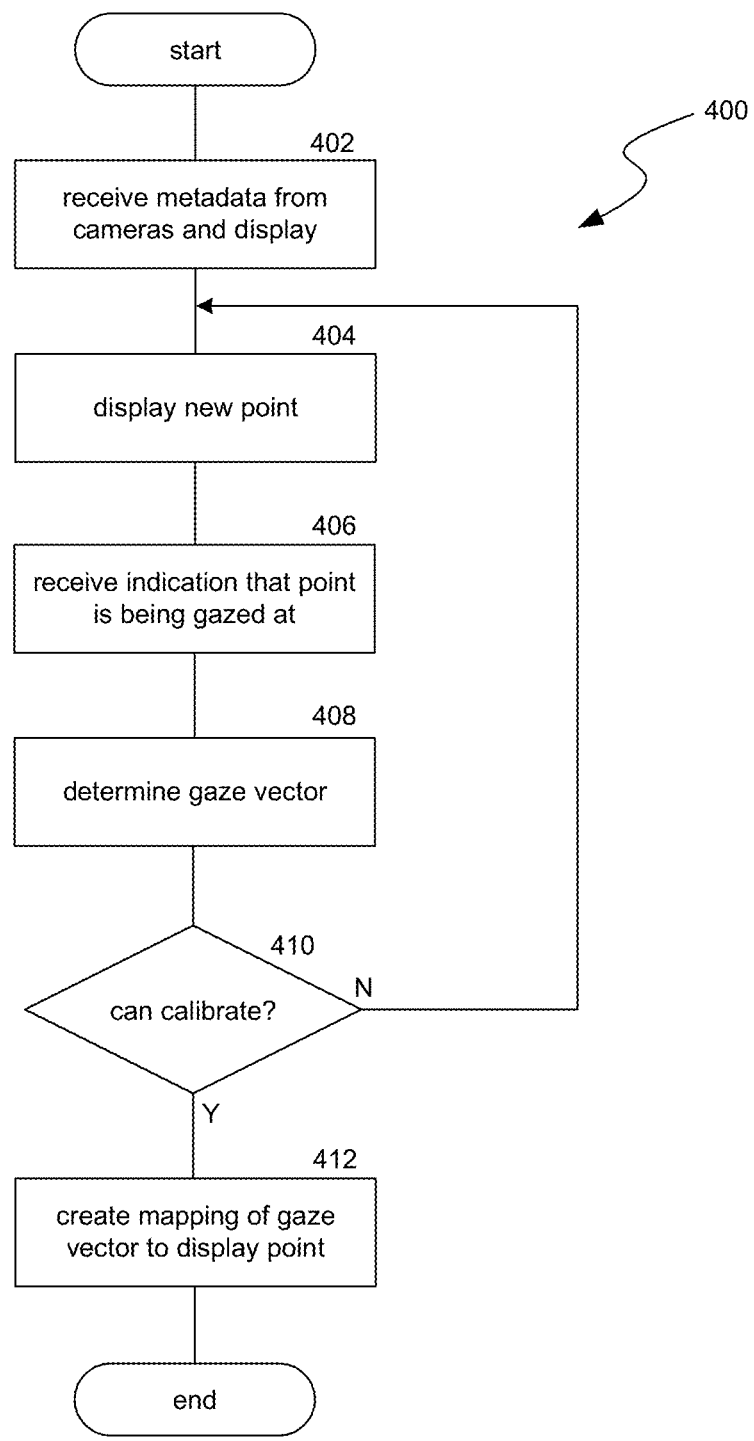
FIG. 4 is a flow diagram illustrating a process used in some implementations for setting up gaze detection.

FIG. 4 is a flow diagram illustrating a process 400 used in some implementations for setting up gaze detection. In some implementations, process 400 can be performed in response to a user requesting setup of camera devices and display devices for gaze detection e.g., when a user has placed at least two camera devices within vicinity of a display device and selects a user interface element to begin the setup process, or when the user finds the current gaze detection to be inaccurate and requests to go through setup again. In various implementations, process 400 can be performed on a server device (e.g., a server that received input from a client and performs the camera calibration process for gaze detection, creating mappings from gaze vectors to gaze points) or a client device (e.g., a local computing device or mobile device for calibrating built-in cameras, displays, or external cameras for gaze detection, creates mappings from gaze vectors to gaze points). After creating a mapping of gaze vectors to gaze points, process 400 can provide the mapping function, e.g., for use in process 500 of FIG. 5 at block 504.

At block 402, process 400 can receive metadata from the user's camera devices and display device. Metadata from camera devices can comprise the positions of the camera devices relative to the display device (e.g., physical coordinates, distance), intrinsic camera parameters (e.g., focal length, image sensor format, principal point), extrinsic camera parameters (e.g., position of camera's center, camera's heading in world coordinates), or any other information needed for camera calibration and 3D reconstruction. Metadata from display devices can comprise the display size, display resolution, and/or display device's position relative to each of the camera devices (e.g., physical coordinates, distance). In some implementations, process 400 can use two camera devices that are positioned at various locations. For example, a user can position one camera device near the top left of the display device, while positioning a second camera on the bottom right of the display device, or vice versa. In some implementations, process 400 can use a 3rd camera device positioned in the top/bottom center of the display device. Process 400 can use this 3rd camera device for obtaining images/videos of the user's face position centered with respect to the display device. The camera devices can be any cameras integrated already into the display device, built-in computing/mobile device cameras, VR/AR headsets, or any other commercially available camera (including RGB or depth camera) devices.

At block 404, process 400 can display a new point on the user's display device. The displayed point can be part of a sequence/set of calibration points to be displayed on the display device one at a time after the user has provided a response to each point. For example, the sequence/set of points can be points located at the center, left, right, top, bottom, top left, top right, bottom left, or bottom right of the screen. The displayed point can be a point in that sequence of points as process 400 iterates through the sequence. The displayed point can appear as a noticeable visual element on the display screen, e.g., a colorful dot, asterisk, shape, etc. When the new point is displayed, process 400 can also request that the user stare at the point for at least a certain amount of time.

At block 406, process 400 can receive an indication from the user that the displayed point is currently being gazed at by the user. The indication can be in the form of a mouse click on the displayed point, click of a user interface element (e.g., a GUI button), audio feedback that the user is currently looking at the point (e.g., "I am looking at the newly displayed point"), and/or a hand motion/gesture (e.g., a thumbs up signaling the user is looking at the displayed point). In some implementations, process 400 can determine that the user has been looking at the point for a period of time exceeding a predefined threshold amount of time (e.g., the user has not moved their head/eyes from the point for at least 3 seconds). This can mean that the user has looked at the displayed point long enough such that process 400 can consider it as an indication that the user is gazing at the displayed point. In response to receiving the indication, process 400 can capture one or more image/video of the user's face and head at the moment the indication is received. In various implementations, process 400 can capture the video of the user's face/head using cameras that sample at a fast rate of at least, e.g., 60 or 120 frames per second. Process 400 can subsequently select one or more frames of the video that are within a threshold time of the indication from the user.

At block 408, process 400 can determine a gaze vector corresponding to the user's gaze. Process 400 can determine the gaze vector from the image/video captured of the user's face and head when the indication that the user is gazing at the point is received. In some implementations, process 400 can track an eye vector (or pupil-glint vector) based on corneal reflections of the user's eyes in the image/video captured. Process 400 can use lighting devices (e.g., a selfie light, indoor lighting) that create the corneal or light reflections in the user's eyes. Process 400 can determine a position of a user's cornea based on a pattern of reflected light off the user's eye-such as by identifying a ring of lights that indicate reflections around the raised part of the eye that makes up the cornea. Process 400 can determine the eye vector as coming from the center of the identified cornea and being perpendicular to a plan formed by the pattern of reflected lights. In some implementations, process 400 can also track a user's head position and eye angle relative to the head based on the head's orientation and eye's orientation relative to the head respectively in the image/video captured. Process 400 can determine how the user's head is positioned in a 3D space. After determining the head position and eye angles, process 400 can combine the head position and eye angles to determine a line that extends at the combined angle from the user's eyes (can be either one or a combination of both) or center of head. This line can be the determined gaze vector. For example, process 400 can determine first that the head is positioned at a particular point in 3D space with a particular orientation to the display, and that the eyes have rotated in relation to the head by 10 degrees about the X-axis of the head. Process 400 can then determine a line that extends from the position of the eyes in the head at the specified angle to be the gaze vector. In some cases, process 400 can use a 3D model of the user's head and eyes to determine the gaze vector is. For example, process 400 can match the user's head and eye positions to the 3D model to determine what the gaze vector is given the head and eye configuration.

After determining the gaze vector, process 400 can create a gaze vector and associated calibration point pair (the new point displayed at block 404 in the current iteration of process 400), e.g., a gaze vector-calibration point tuple of the form {gaze vector coordinates, calibration point coordinates}. Process 400 can save this pair to be subsequently used at block 412 for creating mappings of gaze vectors to gaze points.

At block 410, process 400 can determine whether it can calibrate the gaze vectors to map to gaze points on the display device. Process 400 can check whether it has iterated through the entire sequence of calibration points needed to create a mapping (described previously in relation to block 404). The number of calibration points needed can depend on how many are necessary to fit the mapping function to be used (e.g., n-order polynomial, machine learning model) and create a one-to-one mapping of gaze vectors to gaze points. For example, at least n+1 gaze vector-calibration point pairs are needed to uniquely determine the parameters of an n-order polynomial and fit the pairs to create a one-to-one mapping. In response to determining that it cannot calibrate yet, process 400 can proceed back to block 404. Process 400 can then display a new calibration point in the sequence of calibration points and start a new iteration of determining a gaze vector for the new calibration point displayed. In response to determining that it can calibrate, process 400 can proceed to block 412.

At block 412, process 400 can create a mapping of gaze vector to display points, or gaze points. Process 400 can obtain the gaze vector-calibration point pairs saved at iterations of block 408 and then fit the points to a mapping function of choice. The mapping function can be an n-order polynomial, linear polynomial, machine learning model, or any analytical function whose parameters are determined as the function is fit to the gaze vector-calibration point pairs. For example, the mapping function can be a second order polynomial that can output gaze point coordinates for gaze vectors. As another example, the mapping can be a machine learning model trained to generate gaze point coordinates for gaze vectors. After fitting the mapping function, process 400 can use the function to map any gaze vector to any gaze point on the display device. In some implementations, process 400 can provide the mapping, e.g., for use in process 500 of FIG. 5 at block 504, for use in process 600A of FIG. 6 at block 604, or for use in process 600B of FIG. 6B at block 622.

Figure 5:
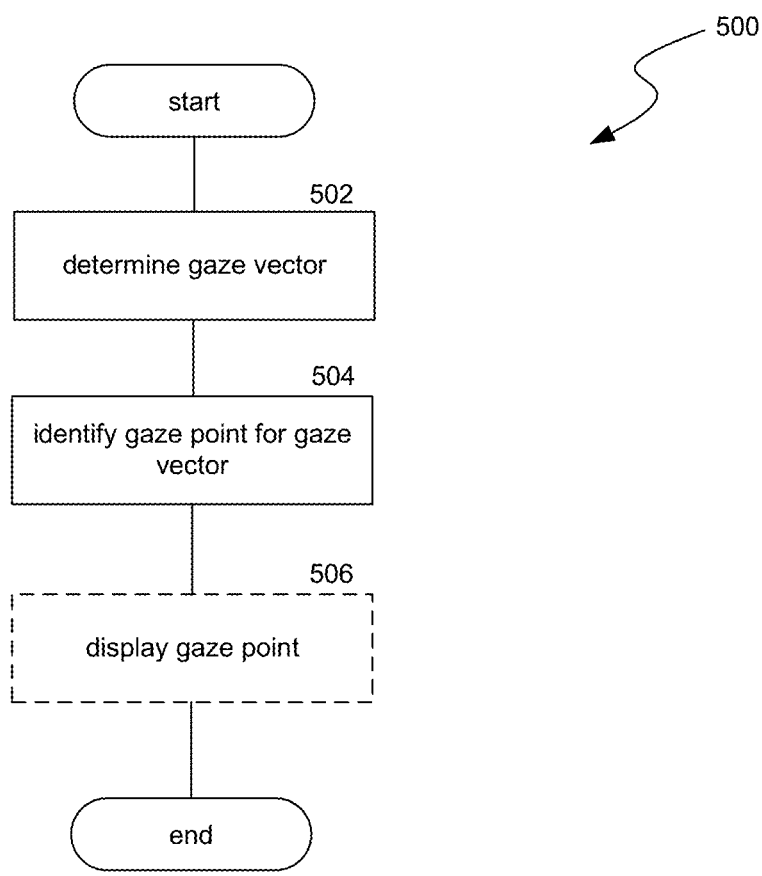
FIG. 5 is a flow diagram illustrating a process used in some implementations for determining mappings of gazes to points on a display.

FIG. 5 is a flow diagram illustrating a process 500 used in some implementations for determining mappings of gazes to points on a display. In some implementations, process 500 can be performed in response to detecting that one or more users are currently looking at their display device e.g., when the user(s) is/are looking at different points on the display. In various implementations, process 500 can be performed on a server device (e.g., a server that sets up and calibrates camera devices and display devices for gaze detection, creates mappings from gaze vectors to gaze points) or a client device (e.g., a local computing device or mobile device for calibrating built-in cameras, displays, or external cameras for gaze detection, creates mappings from gaze vectors to gaze points). After identifying a gaze point, process 500 can provide the identified gaze point, e.g., for use in process 600A of FIG. 6A at block 604, for use in process 600B of FIG. 6B at block 622. As discussed above, in various implementations, any block of these flow charts can be removed. However, block 506 is specifically called out as being removable by illustrating it in dashed lines.

At block 502, process 500 can determine a gaze vector for the user gazing at their display device. Process 500 can determine the gaze vector using methods described in relation to block 408 of FIG. 4. In some implementations, process 500 can determine multiple gaze points for multiple users currently staring at the display device. For example, User A and User B can both be looking at contents on a single display, and process 500 can determine a gaze point corresponding to User A's gaze and a gaze point corresponding to User B's gaze.

At block 504, process 500 can identify a gaze point on the user's display screen for the determined gaze vector. Process 500 can identify the gaze point by using the mapping of gaze vector to gaze point created at block 412 of process 400 in FIG. 4. Process 500 can input the gaze vector to the mapping and receive coordinates of an outputted gaze point on the display device. The outputted gaze point corresponds to the user's gaze at the display screen during the current time instance. In some implementations, process 500 can identify multiple gaze points for multiple gaze vectors. If at block 502 multiple gaze vectors are determined, then process 500 can identify a gaze point corresponding to each of the multiple gaze vectors by applying the mapping to each of the gaze vectors. For example, process 500 can determine a gaze point at the lower left of the screen corresponding to User A's gaze vector and a gaze point at the upper right of the screen corresponding to User B's gaze vector when both are looking at the same display device.

At block 506, process 500 can display the identified gaze point for the gaze vector on the user's display screen. In some implementations, the gaze point can be a cursor, dot, shape, or any other visual indicator to show the user where they are currently gazing at on the display device. When the user's gaze shifts, process 500 can repeat and the displayed gaze point can, in response, shift as well on the screen to reflect the new location that the user is looking at. For example, process 500 can identify a gaze point for a user currently gazing at the center of their display screen. When the user shifts where they are looking, process 500 can repeat and identify a new gaze point to where the user has shifted their gaze. In some implementations, process 500 can display multiple identified gaze points if more than one gaze points are identified at block 504. For example, process 500 can display a red cursor for User A's gaze point at the lower left of the screen and a blue dot for User B's gaze point at the upper right of the screen.

Figure 6A:
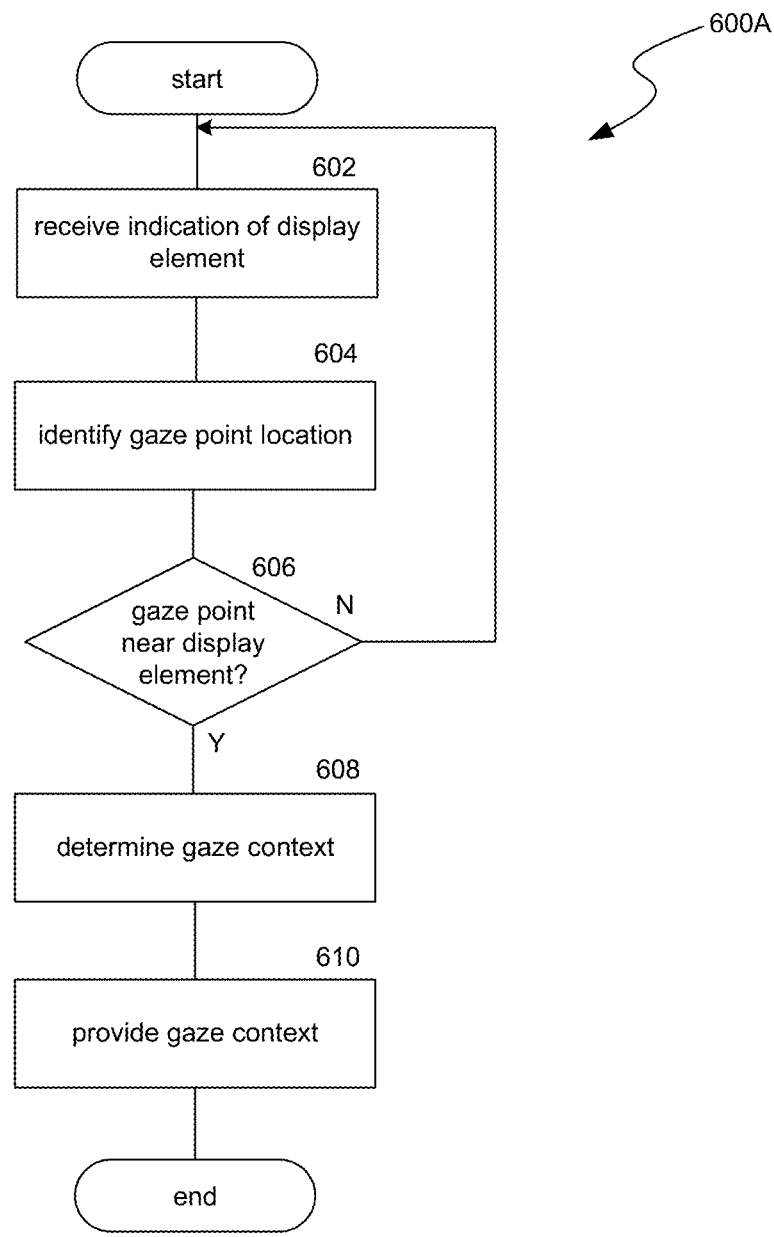
FIG. 6A is a flow diagram illustrating a process used in some implementations for providing gaze context in response to display elements.

FIG. 6A is a flow diagram illustrating a process 600A used in some implementations for providing gaze context in response to display elements. In some implementations, process 600A can be performed in response to detecting that one or more visual elements are being presented on a user's display device e.g., when visual elements such as pop-ups or notifications are displayed on a user's screen. In various implementations, process 600A can be performed on a server device (e.g., a server that determines what display elements to present to the user, makes visible the display elements on a display device, extracts the user's gaze context if they reacted to the display elements, transmits the gaze contexts to other entities for evaluation) or a client device (e.g., a local computing device or mobile device that determines what display elements to present to the user, makes visible the display elements on the connected display device, extracts the user's gaze context if they reacted to the display elements, transmits the gaze contexts to other entities for evaluation). When identifying gaze point locations, process 600A can obtain the identified gaze point, e.g., provided by process 500 of FIG. 500 at block 504.

At block 602, process 600A can receive an indication that a display element is currently displayed on the display device. For example, process 600A can determine that a display element such as a system pop-up, system notification, advertisement pop-up, message/email notification, phishing activity, virus warning or alert has been displayed on the display screen to the user. At block 604, process 600A can identify the gaze point location when the display element is on the user's display screen. In other words, process 600A can obtain the current gaze point identified at block 504 of FIG. 5, and then identify the position of the gaze point on the display device (e.g., pixel coordinates on the screen, group of pixels on screen where gaze point is). In some implementations, block 604 can trigger process 500 of FIG. 5 to be performed so as to determine the gaze point.

At block 606, process 600A can determine whether the identified gaze point location is near the display element. In some implementations, process 600A can compare the positions (e.g., display pixel coordinates) of the gaze point and display element to determine whether they are within a predefined threshold amount of distance (e.g., number of display pixels apart) of one another. If the positions are within a predefined threshold, then process 600A can determine the gaze point to be near the display element. For example, process 600A can determine that the gaze point is within a threshold of 10 display pixels of the display element and thus the two are in proximity. In response to determining that the gaze point is not near the display element, process 600A can return to block 602 to continue to determine whether the display element is shown and, at block 604, whether the user's gaze is focused on the display element. In response to determining that the gaze point is near the display element, process 600A can proceed to block 608.

At block 608, process 600A can determine a gaze context for the user's gaze. The gaze context can include any context related to how the user reacted to the display element. Examples of gaze context can include, but are not limited to, the user's emotional state, user's identity, user's body language, how long it took the user to focus on the display element, how long the user's gaze stayed on the display element, and/or what part of the display element the user was specifically looking at (e.g., the picture of a product or service in an advertisement pop-up, the warning message text in a virus alert or security compromise, the title of an email notification, the name of a sender of a message notification). In some implementations, process 600A can determine the user's emotional state, identity, or body language by using computer vision methods to segment the user's face or body and match the segmented face or body with templates of different facial expressions, identities, or body languages respectively. In various implementations, process 600A can use a machine learning model trained to predict the user's emotional state, body language, or identity given an image of the user's face or body.

The user's emotional state or body language can be useful for determining whether the user has reacted positively or negatively to the display element. For example, the user may be happy to see an advertisement for a product or service they want to purchase, may laugh when they get a funny message from a friend, may be stressed to see an alert that a virus has been detected on their computer, or can be lying when logging onto a webpage. The user's identity can be useful for determining patterns of what kinds of display elements they like to see. For example, User A may often look at message notifications from User B, but ignore message notifications from User C. On the other hand, User D may often look at email notifications from User C but ignore email notifications from User B. Different identities can have different behaviors to display elements, making identity a useful context. How long a user focused on looking at a display element can signal how interested they were in the display element, while which part of the display element the user looked at can signal which portion of the display element the user is most interested in. For example, a prolonged focus of User A on an email notification from User B can indicate that User B's emails are important to User a. As another example, a focus of User A on pictures more so than text on advertisement pop-ups can indicate that User A's attention can be caught more easily by visuals.

At block 610, process 600A can provide the determined gaze context to other entities. In some implementations, process 600A can first create a display element and associated context pair (e.g., save a tuple of {display element, context}). For a display element-context pair, the display element can be labeled (e.g., image of ad to buy shoes, email notification from User Z, etc.) and the context can be labeled as well (e.g., emotional state of angry or happy, user identity, time it took user to look at display element in seconds, display pixel coordinates of where on the display element the user was focused). Process 600A can provide the display element-context pair to other entities such as third-parties (e.g., one associated with the display element) for determining further actions to carry out based on the relation of the display element and gaze context. Examples of third-party entities can include, but are not limited to, moderators, advertisement agencies, data-collection institutions, ecommerce platforms, government agencies, corporations, etc. In some implementations, instead of or in addition to providing the gaze context to a third party, the gaze context can be used locally to gather user data or customize display elements.

Figure 6B:
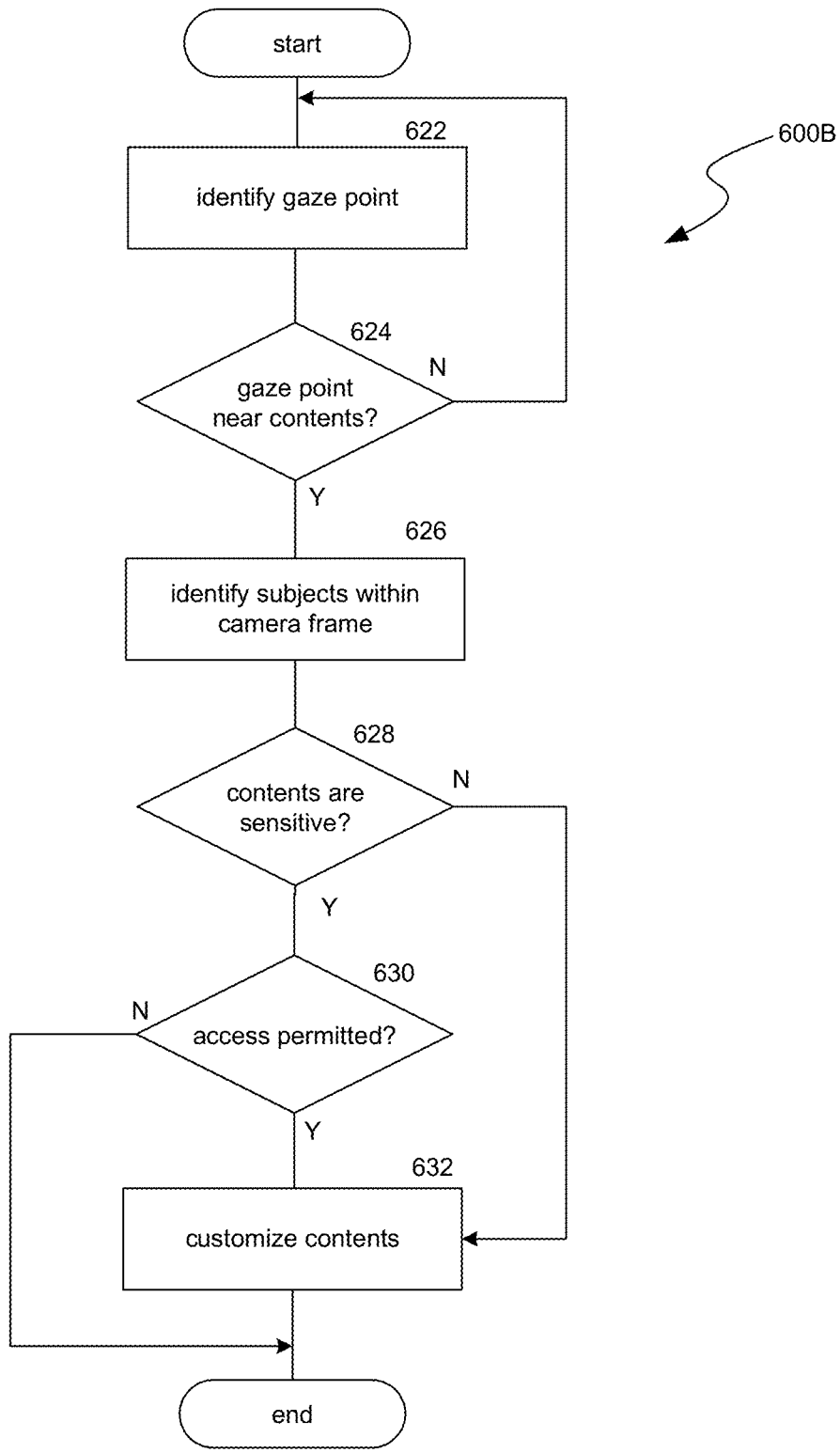
FIG. 6B is a flow diagram illustrating a process used in some implementations for determining when to make sensitive contents available.

FIG. 6B is a flow diagram illustrating a process used in some implementations for determining when to make sensitive contents available. In some implementations, process 600B can be performed in response to detecting that one or more sensitive contents are being presented on a user's display device, e.g., when sensitive contents such as bank accounts, private messages and email inboxes, classified or confidential information are displayed on the user's screen. In various implementations, process 600B can be performed on a server device (e.g., a server that keeps contents on a display device unshown initially, identifies what subjects are gazing at what locations on the display device, checks whether subjects are authorized or not if the contents are sensitive, makes visible customized contents or shared content for the various identified subjects) or a client device (e.g., a local computing device or mobile device that keeps contents unshown initially on the connected display device, identifies what subjects are gazing at what locations on the display device via connected camera devices, checks whether subjects are authorized or not if the contents are sensitive, makes visible customized contents or shared content for the various identified subjects). When identifying gaze points, process 600B can obtain the identified gaze point, e.g., provided by process 500 of FIG. 500 at block 504.

At block 622, process 600B can identify a gaze point. In some implementations, block 622 can trigger process 500 of FIG. 5 to be performed to identify a gaze point. In some implementations, process 600B can identify multiple gaze points if there are multiple users gazing at the display device. In such instances, block 622 can trigger process 500 of FIG. 5 for each user's gaze. At block 624, process 600B can determine whether the identified gaze point is near particular customizable contents currently on the display device. The particular contents can be initially hidden, blurred, darkened, have its pixels turned off, minimized (if the contents are an application window) on the display screen, or shown with default material. Such particular customizable contents can be customized when a user looks at them, e.g., making the contents visible or unobscured when viewed by an authorized user or customizing which materials are in the contents depending on which user is viewing them. Process 600B can determine whether the identified gaze point is near the particular contents in a similar way to the method described in relation to block 606 of FIG. 6, except checking for proximity to the particular contents rather than display elements. In some implementations, if more than one gaze point is identified, process 600B can determine whether any of the gaze points are near the particular contents. In response to determining that the gaze point(s) is/are not near the particular contents, process 600B can return to block 622 to continue to identify whether there is a gaze point on the display device. In response to determining that the gaze point(s) is/are near the particular contents, process 600B can proceed to block 626.

At block 626, process 600B can identify the subjects currently within the camera frame. In other words, process 600B can determine the identities of people currently in range of the camera devices and appear in images/videos collected. In some implementations, process 600B can use face-detection models (e.g., machine learning models trained on faces, template matching of faces) to determine the identity of users currently in frame of the camera feed and label each user. For example, process 600B can determine in a workplace setting that an authorized administrative user is gazing at the contents, while an unauthorized individual is moving behind the administrative user and/or approaching the display device. In some implementations, process 600B can also use computer vision methods to analyze facial features of the subjects and determine whether users appear suspicious.

At block 628, process 600B can determine whether the contents are sensitive contents. Sensitive contents can be contents on the display device that await verification and/or permission to be accessed. For example, the sensitive contents can be classified company or organization information/ data, financial information or accounts, government classified information/data, personal identification, personal classified information/data, user accounts, contracts, technological/scientific secrets, highly sensitive secrets, or any combination thereof. In response to determining that the contents are not sensitive contents, process 600B can proceed to block 632. In response to determining that the contents are sensitive contents, process 600B can proceed to block 630.

At block 630, process 600B can determine whether the identified subjects are permitted to access the sensitive contents. For example, process 600B can grant access of the sensitive contents to the users when all are identified, no unrecognized/unpermitted subject is in the background, and/ or not suspicious or deceptive activity is detected. Process 600B can deny access of the sensitive contents to the user when not all subjects are identified, an unrecognized/unpermitted subject is in the background, and/or suspicious or deceptive activity is detected. In response to determining access is not permitted, process 600B can be terminated, meaning the sensitive contents can be kept from being shown to the users. In response to determining access is permitted, process 600B can proceed to block 632.

At block 632, process 600B can customize the contents, e.g., by making them visible on the display device to the user(s), removing obscuring features such as by unblurring, brightening, or maximize the application window of the contents, or displaying customized materials for the user identified as gazing at the contents. In some implementations, process 600B can display user specific contents at each gaze point identified depending on which user the gaze point corresponds to (identity determined at block 626). In other words, process 600B can customize the contents to be user-specific depending on who the identified subject is that corresponds to the gaze point located near the content. For example, process 600B can make visible User A's bank account menu at User A's gaze point location at the upper right of the screen, can make visible User B's email inbox at User B's gaze point location at the bottom left of the screen, and can make visible User C's private will at User C's gaze point location at the center of the screen. Then, when User B is no longer viewing the bottom left of the screen but instead user C's gaze switches to the bottom left of the screen, User C's email inbox is displayed there instead. As another example, in a workplace/facility, process 600B can make visible company financial data at the financial analyst's gaze point, can make visible proprietary technology and scientific R&D information at the engineer's gaze point, and can make visible non-disclosable government/business contracts at the in-house counsel's gaze point.

In various implementations, process 600B can display contents to be shared across the identified users. For example, when a husband and wife are identified within the frame of the camera devices at block 626, process 600B can display a joint back account shared between the husband and wife and/or their individual bank accounts as well. In other words, process 600B can display a specific shared content item for a specific group of subjects identified within the camera frame. As another example, in the workplace/facility, process 600B can make visible a company-wide virtual conference when the financial analyst, engineer, and in-house counsel are all gazing at the display device.

Figure 7:
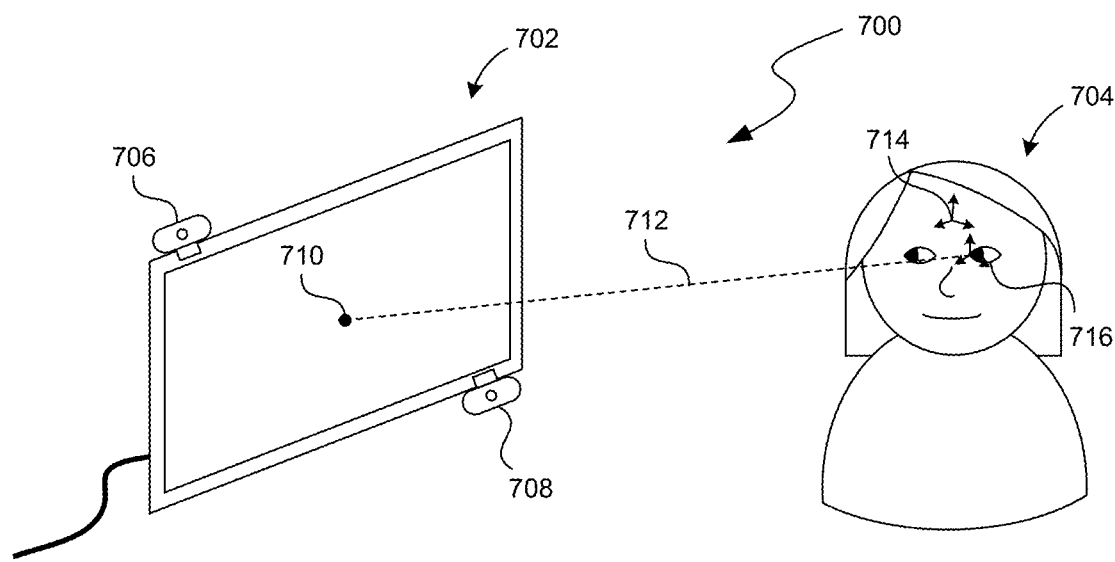
FIG. 7 is a conceptual diagram illustrating an example of determining a gaze point on a display device corresponding to a user's gaze.

FIG. 7 is a conceptual diagram illustrating an example 700 of determining a gaze point 710 on a display device 702 corresponding to a user 704's gaze. Example 700 can include a display device 702, camera device 706, and camera device 708. When user 704 is gazing at display device 702, the gaze detection and application system can determine gaze vector 712 for the gaze of user 704. In some implementations, the gaze detection and application system can determine that user 704 has a head orientation 714 and eye orientation 716. To determine gaze vector 712, the gaze detection and application system can combine head orientation 714 and eye orientation 716 and determine a line extending at the combined orientation from user 704's left eye (can also be the right eye of or the center of user 704's head). In other implementations, the gaze detection and application system can determine that gaze vector 712 is an eye vector (pupil-glint vector) of user 704's eye using corneal reflections from the eye of user 704. After determining gaze vector 712, the gaze detection and application system can identify gaze point 710 for gaze vector 712.

Figure 8:
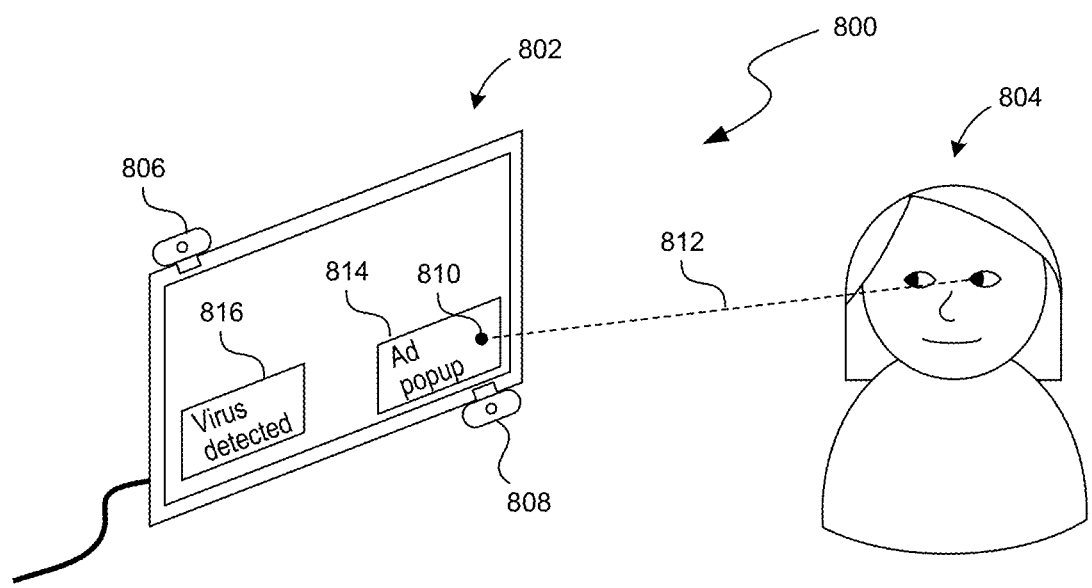
FIG. 8 is a conceptual diagram illustrating an example of determining the gaze context of a user's gaze in response to display elements presented.

FIG. 8 is a conceptual diagram illustrating an example 800 of determining the gaze context of a user 804's gaze in response to display elements 814 and 816 presented. Example 800 can include a display device 802, camera device 806, and camera device 808. When user 804 is gazing at display device 802, the gaze detection and application system can determine gaze vector 812 for the gaze of user 804. After determining gaze vector 812, the gaze detection and application system can identify gaze point 810 for gaze vector 812. When gaze point 810 is near ad popup 814, the gaze detection and application system can determine the context of user 804's gaze to include user 804 being happy, is a female, has the identity/name "Jenny", looked at Ad popup 814 for 10 seconds, and/or was looking at an image of a dress in Ad popup 814. The gaze detection and application system can then provide the determined gaze context along with Ad popup 814 to another entity for further processing. In some implementations, the gaze detection and application system can determine that gaze point 810 is not near virus detected notification 816, and in response notify/alert another entity about it.

Figure 9:
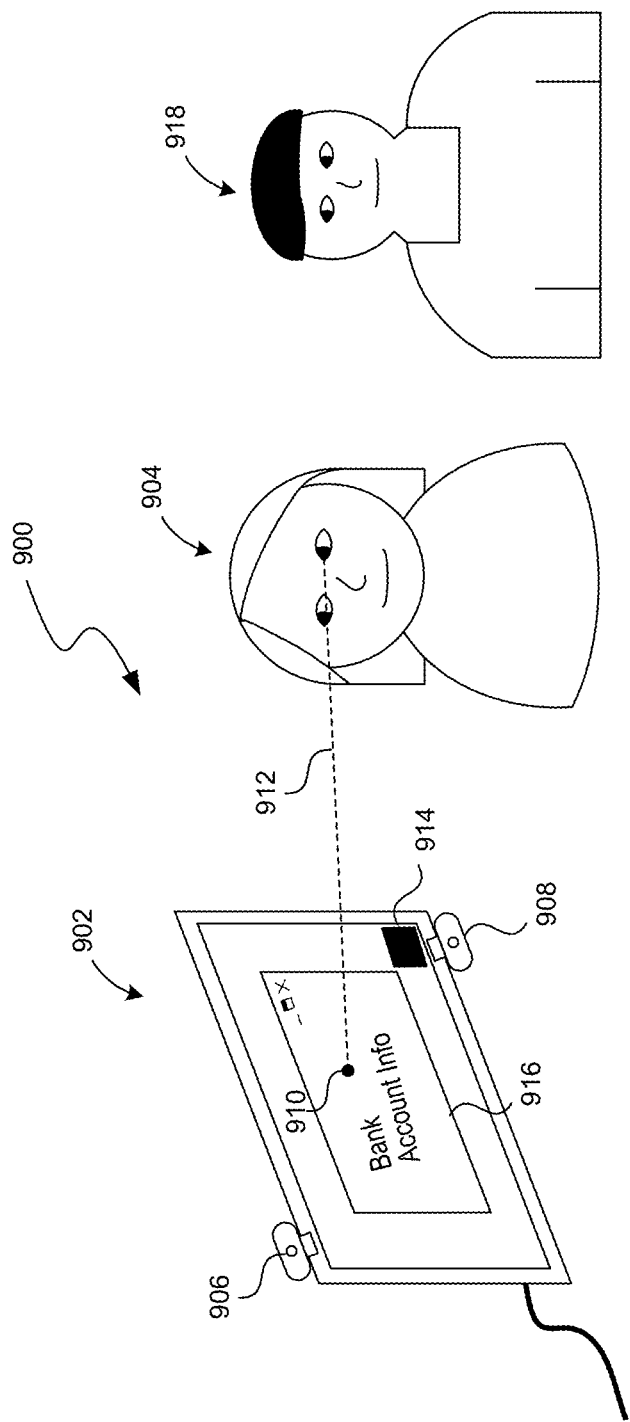
FIG. 9 is a conceptual diagram illustrating an example of determining when to make sensitive contents on a display device visible to users.

FIG. 9 is a conceptual diagram illustrating an example 900 of determining when to make sensitive contents 916 and 914 on a display device 902 visible to users 904 and 918. Example 900 can include a display device 902, camera device 906, and camera device 908. When user 904 is gazing at display device 902, the gaze detection and application system can determine gaze vector 912 for the gaze of user 904. After determining gaze vector 912, the gaze detection and application system can identify gaze point 910 for gaze vector 912. When gaze point 910 is near sensitive bank account information 916, the gaze detection and application system can determine the identities of user 904 and user 918 within the camera frame of camera devices 906 and 908. The gaze detection and application system can identify that user 904 is "Jenny" and user 918 is "Michael", and that both have access to sensitive bank account information 916 (e.g., can be a joint account for Jenny and Michael who have a married relationship). In response to identifying that user 904 and user 918 both have access, the gaze detection and application system can make visible the sensitive bank account information 916 (e.g., maximize the web browser window, unblur display pixels, brighten display pixels). Since gaze point 910 is not near sensitive content 914, the gaze detection and application system can keep sensitive content 914 blurred or darkened on display device 902. If gaze point 910 moves near sensitive content 914, the gaze detection and application system can determine whether user 904 and user 918 have access to see sensitive content 914. In some instances, the gaze detection and application system can determine that even though user 904 has access to sensitive content 914, user 918 does not, and subsequently keeps sensitive content 914 darkened or blurred on display device 902.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

I claim:

1. A method for securely making contents on display devices visible, the method comprising:
   determining, by one or more camera devices, a gaze point on a display device corresponding to a user gaze of a user by:
      determining a gaze vector corresponding to the user gaze; and
      identifying the gaze point on the display device that is mapped from the gaze vector;
   determining that the gaze point is in proximity to a sensitive content on the display device that is displaying both the sensitive content and a non-sensitive content, wherein the sensitive content is blurred on the display device, wherein the non-sensitive content is not blurred on the display device;
   in response to determining that the gaze point is in proximity to the sensitive content, identifying the user within a frame of the one or more camera devices;
   determining that the user is permitted to access the sensitive content on the display device; and
   in response to determining that the user is permitted to access the sensitive content, making the sensitive content unblurred on the display device.

2. The method of claim 1, further comprising:
   receiving one or more metadata records from the one or more camera devices and the display device;
   for a calibration point of one or more calibration points on the display device:
      displaying the calibration point on the display device;
      receiving an indication that the calibration point is being gazed at by a user; and
      determining a gaze calibration vector for the calibration point based on the one or more metadata records and one or more image data records capturing the user; and
   creating a mapping of gaze vectors to points on the display device based on the one or more calibration points and corresponding gaze calibration vectors.

3. The method of claim 2,
   wherein the one or more metadata records from the one or more camera devices comprise one or more of: positions of the one or more camera devices relative to the display device, intrinsic parameters of the one or more camera devices, extrinsic parameters of the one or more camera devices, or any combination thereof,
   wherein the one or more metadata records from the display device comprise one or more of: display size of the display device, display resolution of the display device, position of the display device relative to the one or more camera devices, or any combination thereof; and
   wherein the one or more image data records comprise images and/or videos of a head and/or face of the user.

4. The method of claim 2, wherein the one or more calibration points are located at a center, left, right, top, bottom, top left, top right, bottom left, or bottom right location of the display device.

5. The method of claim 2,
   wherein the received indication is a confirmation from the user that they are gazing at the calibration point, and
   wherein the confirmation comprises one or more of: a button press, mouse device click, activation of a graphical user interface element, audio feedback, touchscreen gesture, cursor gesture, or any combination thereof.

6. The method of claim 2, wherein the determining the gaze vector further comprises:
   tracking an eye vector in the one or more image data records based on corneal light reflections on an eye of the user and the one or more metadata records; and
   setting the gaze vector to be the eye vector.

7. The method of claim 2, wherein the determining the gaze vector and gaze point further comprise:

tracking a head orientation of the user and the one or more metadata records;
tracking an eye angle with respect to the head orientation based on the one or more metadata records;
generating the gaze vector by combining the eye angle and the head orientation; and
determining the gaze point as a point on the display device where the gaze vector intersects a coordinate on the display device.

8. The method of claim 2, wherein the determining the gaze vector further comprises:
obtaining a three-dimensional model of a head and/or eyes of the user;
determining a model orientation of the three-dimensional model based on an orientation of the head and/or eyes of the user and the one or more metadata records; and
determining the gaze vector based on the model orientation.

9. A computer-readable storage medium storing instructions that, when executed by a computing system, cause the computing system to perform a process for securely making contents on display devices visible, the process comprising:
determining, by one or more camera devices, a gaze point on a display device corresponding to a user gaze of a user by:
determining a gaze vector corresponding to the user gaze; and
identifying the gaze point on the display device that is mapped from the gaze vector;
determining that the gaze point is in proximity to a sensitive content on the display device that is displaying both the sensitive content and a non-sensitive content, wherein the sensitive content is hidden or obscured on the display device, wherein the non-sensitive content is not obscured on the display device;
identifying the user within a frame of the one or more camera devices;
determining that the user is permitted to access the sensitive content on the display device; and
in response to determining that the user is permitted to access the sensitive content, making the sensitive content visible or unobscured on the display device.

10. The computer-readable storage medium of claim 9, the process further comprising:
determining, by the one or more camera devices, a second gaze point on the display device corresponding to a second user gaze of a second user by:
determining a second gaze vector corresponding to the second user gaze; and
identifying the second gaze point on the display device that is mapped from the second gaze vector;
determining that the second gaze point is in proximity to the sensitive content on the display device; and
determining that the identified-second user is permitted to access the sensitive content on the display device;
wherein the making the sensitive content visible or unobscured on the display device is further in response to the determining that the second user is also permitted to access the sensitive content.

11. The computer-readable storage medium of claim 9, wherein identifying the user further comprises:
detecting a face of the user based on one or more image data records from the one or more camera devices; and
identifying the face of the user using a machine learning model and/or a computer vision method.

12. The computer-readable storage medium of claim 9, wherein the making the sensitive content visible or unobscured comprises: unblurring the sensitive content on the display device, turning on or brightening a set of pixels of the display device where the sensitive content is located, maximizing an application window of the sensitive content, or any combination thereof.

13. The computer-readable storage medium of claim 9, wherein the process further comprises, after the making the sensitive content visible or unobscured on the display device:
determining a gaze point on the display device corresponding to a second user's gaze of a second user;
determining that the gaze point is in proximity to the sensitive content on the display device;
determining that the second user is not permitted to access the sensitive content; and
in response to determining that the second user is not permitted to access the sensitive content, making the sensitive content hidden or unobscured on the display device.

14. The computer-readable storage medium of claim 13, wherein the process further comprises:
in response to determining that the second user is not permitted to access the sensitive content, sending, to an entity associated with the sensitive content, a notification that a security event was detected.

15. The computer-readable storage medium of claim 14, wherein the process further comprises:
determining a gaze context associated with the user, the gaze context comprising one or more of: user emotional state, user body language, user facial expression, how long it took the user gaze to focus on a display element, what part of the display element the gaze point landed on first, or any combination thereof; and
wherein the making the sensitive content visible or unobscured is further in response to the gaze context matching corresponding security conditions.

16. A computing system for securely making contents on display devices visible, the computing system comprising:
one or more processors; and
one or more memories storing instructions that, when executed by the one or more processors, cause the computing system to perform a process comprising:
determining, by one or more camera devices, a gaze point on a display device corresponding to a user gaze of a user by:
determining a gaze vector corresponding to the user gaze; and
identifying the gaze point on the display device that is mapped from the gaze vector;
determining that the gaze point is in proximity to a sensitive content on the display device that is displaying both the sensitive content and a non-sensitive content, wherein the sensitive content is blurred on the display device, wherein the non-sensitive content is not blurred on the display device;
in response to determining that the gaze point is in proximity to the sensitive content, identifying the user within a frame of the one or more camera devices;
determining that the user is permitted to access the sensitive content on the display device; and
in response to determining that the user is permitted to access the sensitive content, making the sensitive content unblurred on the display device.

17. The computing system of claim 16, wherein the process further comprises:

receiving an indication of a display element being displayed on the display device;

identifying a location of the gaze point on the display device;

determining that the location of the gaze point is within a threshold distance of the display element on the display device;

in response to determining that the location of the gaze point is within the threshold distance, determining a gaze context associated with the user gaze; and providing the gaze context to one or more entities associated with the display element.

18. The computing system of claim 17, wherein the gaze context comprises one or more of: user emotional state, user body language, user facial expression, how long it took the user gaze to focus on the display element from when the display element was first displayed, what part of the display element the gaze point landed on first, or any combination thereof.

19. The computing system of claim 17, wherein the one or more entities are: moderators, advertisement agencies, data-collection entities, ecommerce platforms, government agencies, security agencies, companies, or any combination thereof.

20. The computing system of claim 17, wherein the display element comprises one or more of: a message or email notification, system device notification, system security warning, advertisement pop-up, user survey pop-up, or any combination thereof.

* * * * *